A. WARTH
LATHE.
No. 22,043.  Patented Nov. 9, 1858.
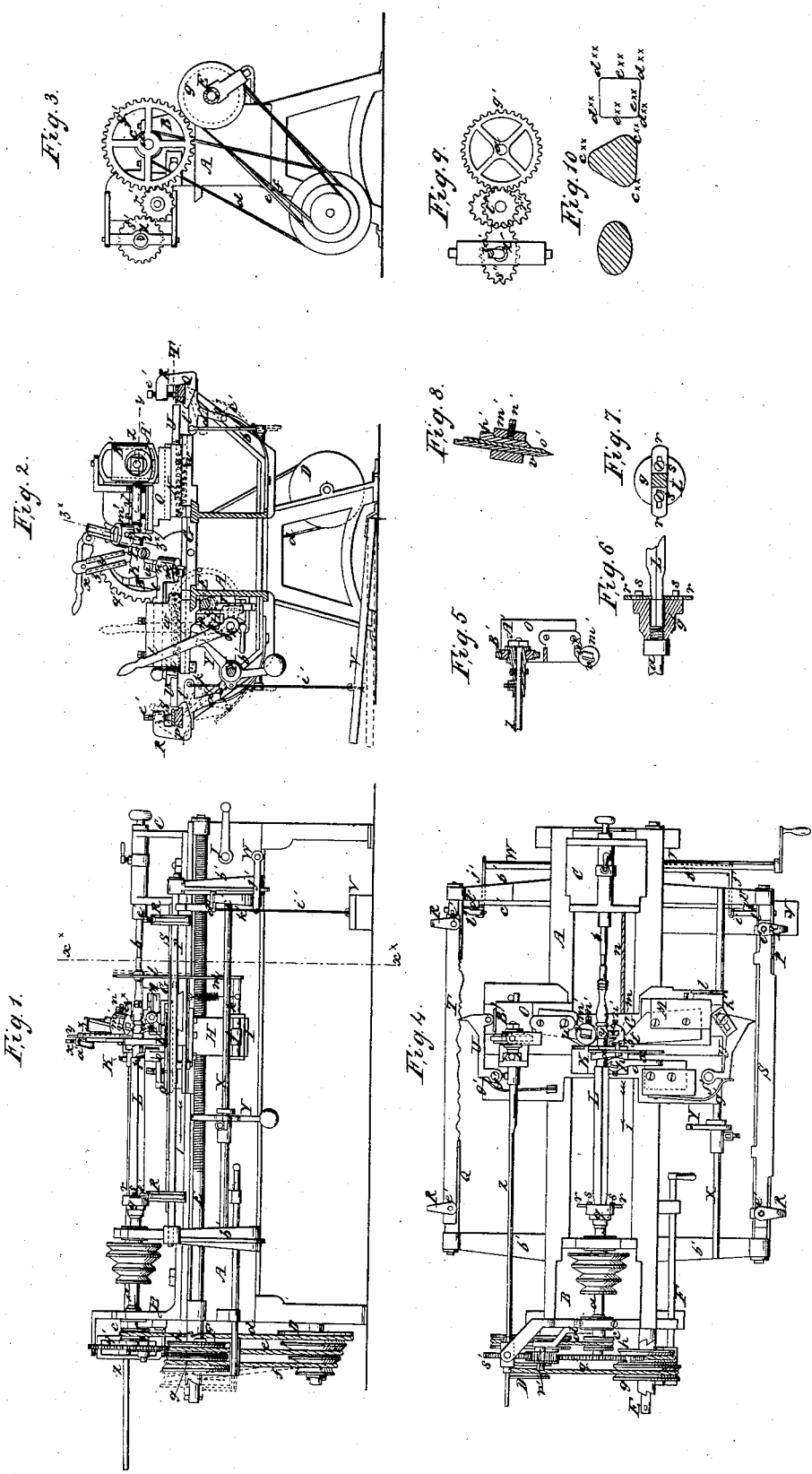

UNITED STATES PATENT OFFICE.

ALBIN WARTH, OF STAPLETON, NEW YORK.

LATHE FOR TURNING WOOD.

Specification of Letters Patent No. 22,043, dated November 9, 1858.

*To all whom it may concern:*

Be it known that I, ALBIN WARTH, of Stapleton, in the county of Richmond and State of New York, have invented certain new and useful Improvements in Turning-Lathes; and I do hereby declare that the following is a full, clear, and exact description of the same, reference being had to the annexed drawings, making a part of this specification, in which,—

Figure 1, is a side view of a lathe constructed according to my invention. Fig. 2, is a transverse vertical section of ditto taken in the line $x^x$, $x^x$, Fig. 1. Fig. 3, is an end view of ditto. Fig. 4, is a plan or top view of ditto. Fig. 5, is a section of a portion of ditto taken in the line $y^x$, $y^x$, Fig. 2. Fig. 6, is a detached longitudinal central section of the socket of the mandrel of the lathe. Fig. 7, is a face view of ditto. Fig. 8, is a section of one of the tool sockets $z^x$, $z^x$, Fig. 2, indicating the plane of section. Fig. 9, is a detached view of a supplemental gearing of the lathe. Fig. 10, shows transverse sections of different forms of work produced by the invention.

Similar letters of reference indicate corresponding parts in the several figures.

This invention relates to certain improvements in that class of turning lathes which are designed for turning, by automatic mechanism, beaded or ornamental work chiefly in wood, such as stair and other balusters, newels, bedstead posts and the like.

The invention is more especially applicable to, and in fact is an improvement on, a turning lathe for which Letters Patent bearing date October 10th, 1854, were granted to me. In the patented lathe the work produced is perfectly circular or cylindrical, that is to say, the beaded configurations can be cut or formed on cylindrical sticks only, transverse sections of which are all circles concentric one with another.

The object of the within described invention is to produce the same character of ornamental work as the patented lathe above alluded to, but on sticks of oval and polygonal as well as on those of cylindrical or circular form, the object being attained by means hereinafter fully shown and described.

To enable those skilled in the art to fully understand and construct my invention I will proceed to describe it.

A, represents an ordinary turning lathe bed.

B, is the stationary and C, the movable head which are fitted on the bed A. The head B, is provided with a mandrel $a$, and the head C is provided with an adjustable center point $b$.

The above parts are well known, common to all lathes of a certain class, and therefore do not require a minute description.

On the outer end of the mandrel $a$, of the head B, a pulley $c$, is placed, around which a belt $d$, passes, said belt also passing around one of a cone of pulleys D, attached to one of the supports of the lathe bed A. Belts $e$, $f$, pass around the other pulleys of the cone D, said belts also passing around pulleys $g$, $h$, on one end of a screw shaft E, which has its bearings attached to one side of the lathe bed A, the screw shaft being parallel with the bed A. The pulleys $g$, $h$, are placed loosely on the shaft E, and either may be connected to it by a clutch F, arranged in the usual way, and shown clearly in Figs. 1 and 4. The belt connection between the mandrel $a$, and screw shaft E, is shown clearly in Fig. 3. The pulleys $g$, $h$, vary in size and it will be seen from the above description that motion is communicated to the screw E, from the mandrel $a$, by the belts $d$, $e$, $f$, and that the speed of the screw E, may be varied in a degree proportionate to the difference between the diameters of the pulleys $g$, $h$, either of which may be made the driving medium from the cone D, by actuating the clutch F.

On the lathe bed A, a slide rest G, is placed and allowed to slide freely back and forth thereon. The screw shaft E, is the medium through which the slide rest is moved or fed along to its work and the connection between the two last named parts is effected as follows.—To the under side of the slide rest G, and at one side a pendent guide H, is attached, see Figs. 1 and 2, said guide extending down near the screw and having a slide I, fitted within it. To the upper end of the slide I, a nut $i$, of semiannular form is attached, and this nut is made to bear against the under side and engage with the screw by means of an arm $j$, which is attached to a shaft $k$, at the lower part of the guide H, the shaft $k$, having a lever $l$, attached to one end of it. By moving the lever $l$, backward the arm $j$, is made to force up the slide I, and engage the nut $i$, with the shaft E, the nut being held in gear in consequence of the lever $l$, bearing against a projection on the slide rest. A spiral spring $m$, is attached to the under side of the slide rest and to the shaft $h$, said spring having a tendency to depress the slide I, and throw the nut $i$, out of gear with the screw shaft. To the slide rest G, a chain or cord $n$, is attached, said chain or cord passing around a winch J, at one end of the bed A.

To the center of the slide rest G, a vertical plate K, is attached, said plate having a circular aperture at its center. This plate forms a bearing for the stick L, being turned. To one side of the slide rest G, an adjustable cutter stock $o$, is attached, having a roughing-off tool $p$, fitted within it. This tool is of gouge form and roughs off the stick L, so that it may just pass through the aperture in plate K. The stick L, is centered between the mandrel $a$, and point $b$, and to the inner end of the mandrel $a$, a socket $q$, is attached, said socket having a square opening to receive the end of the stick, and two blades $r$, $r$, fitted in grooves in its face side and secured in proper position by set screws $s$, $s$. The inner ends of the blades $r$, are pressed into the stick L, a short distance in order to hold it firmly in the socket, and firmly resist the action of the cutting tools which have a tendency to draw the stick from the socket, see more particularly Figs. 6 and 7. On the slide rest G, at one side, a sliding head M, is placed, said head being fitted in a dove-tail groove in the rest. The head M, works or moves in a transverse direction with the bed A, and an adjustable tool stock $t$, is fitted to it said stock having a cutting tool $u$, fitted in it which tool acts on the stick L, just at the outer side of the plate or bearing K. On the slide rest G, at the side opposite to that where the head M, is placed, there is placed a sliding head N, which is arranged precisely similar to the head M. On the head N, however a supplemental sliding head O, is placed, and to the head O, and adjustable cutter $u^x$, is attached, said stock being provided with a cutting tool $v$, which acts on the stick L, above its center the other cutting tools $p$, $u$, acting on the stick below its center. Each sliding head M, N, has a spiral spring $w$, attached to it and to the rest, said springs having a tendency to throw the cutting tools from their work. The springs $w$, are shown by dotted lines in Fig. 2. To the upper part of the plate K, a lever $x$, is attached, said lever bearing on a chisel $y$, which is fitted in a guide $z$, on the plate, the chisel having a spring $a'$ acting upon it, which spring serves to keep the chisel up from the stick L, see more particularly Figs. 1 and 2.

To each side of the lathe bed A, inclined bars $b'$, $b'$, are attached, the outer ends of said bars at each side of the bed being connected respectively by rectangular shafts P, Q, which are allowed to turn in their bearings, the shafts being prevented from turning casually by springs $c'$ which are attached to one of the bars $b'$, at each side of the lathe bed, the springs bearing against arms $d'$, on the shafts, see Figs. 1, 2 and 4. To each shaft P, Q, there are attached two clamps R, R, one near each end. These clamps are merely curved or C-shaped bars attached to the shafts P, Q, and having set screws $e'$, passing through their upper ends. By means of the clamps R, R, patterns S, T, may be secured to the shafts P, Q, and adjusted thereon as may be required. The patterns are flat metal bars having their inner edges of a form corresponding, or rather approximating, as an allowance must of course be made for the feed movement of the cutters, to a longitudinal profile of the sticks to be cut. One pattern S, corresponding with the beads and general ornamental configuration and the other T, with the shoulders or plain taper portions of the stick L. The sliding heads M, N, are actuated from the patterns S, T, by means of arms U, U, which are pivoted to the rest G, as shown at $f'$, Fig. 4, said arms having springs $g'$, bearing against to keep them in contact with the ends of the heads M, N. The outer ends of the arms bear against the patterns when the configurations of either are to be transmitted to the stick. The heads M, N, are virtually lengthened or shortened by adjusting buttons $h'$, which are attached to the arms U, U, one to each, see Fig. 4. By adjusting these buttons the stick L, may be cut with configurations more or less bold or prominent as may be desired.

V, is a treadle which is attached to the flooring below the lathe and is connected by a rod $i'$, to a shaft W, which passes transversely through the lathe bed A, and has an arm $j'$, attached to each end of it at right angles, the arms $j'$, being connected by rods $k'$, with arms $l'$, attached to the shafts P, Q. To the arms $b'$, $b'$, at one side of the lathe bed A, a rod X, is attached, on which an adjustable loaded stop Y, is placed. The use of this stop will be presently explained. It is shown clearly in Figs. 1, 2 and 4.

The cutter stocks $t$, $u^x$, of the heads M, N, have each a socket $m'$, formed on their inner ends, said sockets receiving the tools $u$, $v$, which are secured in the sockets by set screws $n'$. Each cutter $u$, $v$, is provided with a guard iron $o'$, and also with a semi-cylindrical wedge $p'$. The interior of the sockets are circular and it will therefore be seen that the cutters may be turned in their sockets more or less annularly with the stick L, as occasion may require. The guard irons $o'$, insure smooth work preventing the tools or cutters from raising the grain, they perform the same office as the cap plate of an ordinary joiner's plane, see Fig. 8.

To the outer end of the mandrel $a$, of the head B, a spur wheel $q'$, is attached. This spur wheel gears into a pinion $r'$, which in turn gears into a wheel $s'$, through the center of which a shaft Z, passes and is allowed to slide freely, the wheel $s'$, turning the shaft, in consequence of the latter having one or more plane surfaces. To one end of the shaft Z, an eccentric A', is attached, and this eccentric is fitted within a yoke B', which is attached to the supplemental sliding head O, on the head N.

I will here remark that the gearing $q'$, $r'$, $s'$, is not always employed. In certain cases as will be hereinafter shown a system of gearing as shown in Fig. 9, is used. This gearing has two elliptical gears $r''$, $s''$, instead of wheels $r'$, $s'$, and the elliptical gears are operated from the wheel $q'$, through the medium of an intermediate wheel $t'$. The gear $s''$, is also fitted on a shaft Z', which has a crank $u'$, formed on it. The eccentric A', is used with both systems of gearing.

The operation is as follows:—The sticks L, are got out of proper size, and are placed of course one by one in the lathe. One end of the stick is adjusted in the socket $g$, and firmly grasped by the blades $r, r$, and the opposite end is supported by the center $b$. The slide rest G, is moved outward on the bed A, so that the bearing K, and tool $p$, will be at the end of the stick L. The nut $i$, is engaged with the screw E, and the tools $p, u, v$, properly adjusted in the several sockets and the buttons $h'$, are adjusted. Motion is then given the mandrel $a$, and the stock L, is rotated and the slide rest G, moved gradually in the direction indicated by arrow 1, by means of the belt connection $e, f, d$, previously described, and the connection of the rest with the screw by the nut $i$. This movement of the slide rest feeds the cutters or tools $p, u, v$, to their work. The tool $p$, roughs off the stick in cylindrical form preparing it for the action of the tools $u, v$, which as they move along in the direction of arrow 1, are moved toward and from the stick L, by the patterns S, T, and springs $w$. The cutter $u$, of head M, has two movements only, one given it by the screw E, the usual feed movement, the other being given by the pattern S. The tool $u$, forms the plain cylindrical or taper parts of the stick as shown at $a^{xx}$, Figs. 1 and 2, and therefore the two motions described are all that is required. The tool $v$, however has three motions; one in the direction of arrow 1, in common with the other cutters $p, u$, one given it by the pattern T, which produces the ornamental beaded work as shown at $b^{xx}$, and the other motion is given it by the eccentric A'. The eccentric gives the head O, and consequently the tool $v$, an independent quick vibrating movement, the eccentric A', when the gearing $q', r', s'$, is used making two revolutions to one of the stick L. This latter movement of the cutter $v$, produced by the eccentric gives an oval form to the work, the stick L, at the same time being turned in beaded ornamental form, in accordance with the patterns S, T.

From the above description it will be readily seen that if the gearing $q', r', s'$, be varied in proportion, so as to give three revolutions to the eccentric to one of the stick L, the latter will be turned in trilateral form. If four revolutions be given it to one of the stick quadrilateral sticks will be turned or cut, and so on, see Fig. 10, in which transverse sections of oval tri-lateral, quadrilateral sticks are shown. It must be borne in mind however that the polygonal sticks produced by this arrangement will not have sharp or angular corners but of rounded form as shown at $c^{xx}$, Fig. 10. This effect is due to the too slow movement of the tool as it acts at the corners of the work. By applying the gearing shown in Fig. 9, to the mandrel $a$, and eccentric A', the tool $v$, has an alternate slow and rapid movement given it, rapid at certain points so as to form sharp or angular corners as shown at $a^{xx}$, Fig. 10, and comparatively slow to form the sides $e^{xx}$. The same rule as respects the number of sides to be formed on a stick is the same in this variation of gearing as in the former. The number of sides will always correspond to the number of revolutions of the eccentric compared with those of the stick. As the cutters finish their work, the stop Y, is so set that the lever $l$ will be thrown off the projection on the rest G, and the spring $m$, will disengage the nut $i$. The rest G, may then by turning the winch J, be moved to the end of the bed A, for a succeeding operation, and in order to free the levers U, from the patterns S, T, the treadle V, is depressed by the foot and the shafts P, Q, are so turned that the inner edges S, T, of the patterns will be thrown down free from the arms U, as shown in red Fig. 2. The feed movement by actuating the clutch F, may be varied in speed so that either cutter $v, u$, may be fed along quicker or slower as occasion may require, and the buttons $h'$, are so adjusted as to allow the beaded work to be more or less prominent as may be desired. It will be understood of course that by removing the eccentric A', the usual work, or that performed by the patented lathe previously alluded to may be produced.

I would remark that the chisel $y$, is used in case tool handles or other small work are turned continuously on a stick, the chisel $y$, is used for cutting them off. It is operated by hand.

I do not claim a slide rest provided with cutting tools set in vibrating or sliding heads and actuated through the medium of certain mechanism by fixed patterns, for such device was formerly patented by me. Neither do I claim broadly and irrespective of arrangement the employment or use of eccentrics for operating the stuff or pattern; but

Having thus described my invention, what I claim as new and desire to secure by Letters Patent, is,

1. The eccentric $A'$, connected with the tool $v$, and rotated through the medium of the gearing $q', r', s'$, or $q'\ t', r'', s''$, or their equivalents from the mandrel $a$, so as to turn or cut the work in oval or polygonal form as described.

2. I claim the combination of the patterns S, T, the eccentric $A'$, and cutting tools $p, u, v$, attached to the slide rest G, and the feeding device formed of the screw E, and nut $i$, when the whole are arranged to operate automatically as and for the purpose set forth.

ALBIN WARTH.

Witnesses:
Wm. Tusch,
W. Hauff.